(12) United States Patent
Chen et al.

(10) Patent No.: US 9,532,420 B2
(45) Date of Patent: Dec. 27, 2016

(54) LED DRIVE CIRCUIT AND METHOD FOR DRIVING LED

(71) Applicant: DELTA ELECTRONICS, INC., Taoyuan Hsien, Taiwan (TW)

(72) Inventors: Linwei Chen, Taiwan (CN); Xinghua Zhang, Taiwan (CN)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 14/851,673

(22) Filed: Sep. 11, 2015

(65) Prior Publication Data
US 2016/0143104 A1    May 19, 2016

(30) Foreign Application Priority Data

Nov. 18, 2014 (CN) .......................... 2014 1 0658199

(51) Int. Cl.
*H05B 37/00* (2006.01)
*H05B 33/08* (2006.01)

(52) U.S. Cl.
CPC ...... *H05B 33/0815* (2013.01); *H05B 33/0845* (2013.01); *H05B 33/0851* (2013.01)

(58) Field of Classification Search
CPC ............ H05B 33/0815; H05B 33/0845; H05B 33/0851
See application file for complete search history.

(56) References Cited

U.S. PATENT DOCUMENTS

| 8,427,070 B2* | 4/2013 | Matsuda | H05B 33/0839 |
| | | | 315/224 |
| 8,901,851 B2* | 12/2014 | Kuang | H05B 33/0851 |
| | | | 315/186 |
| 9,155,174 B2* | 10/2015 | Draper | H05B 41/3924 |
| 2011/0194311 A1* | 8/2011 | Gaknoki | H02M 7/217 |
| | | | 363/21.12 |

(Continued)

FOREIGN PATENT DOCUMENTS

| CN | 101835314 B | 12/2013 |
| CN | 203722869 U | 7/2014 |

(Continued)

OTHER PUBLICATIONS

Office Action issued Apr 18, 2016 by the TW Office.
Office Action issued Jun. 28, 2016 by the JP Office.

*Primary Examiner* — Jason M Crawford
*Assistant Examiner* — Kurtis R Bahr
(74) *Attorney, Agent, or Firm* — Yunling Ren; Eaton & Van Winkle

(57) ABSTRACT

An LED drive circuit and drive method thereof are provided. The drive circuit comprises: a rectifier circuit receiving a phase-control dimming signal with a conduction angle, and outputting a rectified signal; a converter comprising a switching element, with an input end coupled to the rectifier circuit and an output end coupled to an LED; and a controller having a first input end receiving the rectified signal, a second input end receiving a first sampling signal and an output end outputting a control signal according to the rectified signal and the sampling signal; wherein the switching element receives the control signal from the controller, thus executing an on/off operation to control current flowing through the LED.

13 Claims, 16 Drawing Sheets

(56) References Cited

U.S. PATENT DOCUMENTS

2013/0154487 A1 6/2013 Kuang
2014/0368126 A1* 12/2014 Nakagawa ......... H05B 33/0845
  315/291

FOREIGN PATENT DOCUMENTS

| JP | 2004327152 A | 11/2004 |
| JP | 2008104274 A | 5/2008 |
| JP | 2011165394 A | 8/2011 |
| JP | 2011238439 A | 11/2011 |
| JP | 201269506 A | 4/2012 |
| JP | 2014130698 A | 7/2014 |

* cited by examiner

LED DRIVE CIRCUIT AND METHOD FOR DRIVING LED

CROSS REFERENCE TO RELATED APPLICATION

This application is based on and claims priority to Chinese Patent Application No. 201410658199.7, filed on Nov. 18, 2014, the entire contents of which are incorporated herein by reference.

TECHNICAL FIELD

The present disclosure generally relates to an LED drive circuit and a method for driving an LED applied to LED dimming.

BACKGROUND

Luminance of an LED depends on a current flowing through it, so an LED drive circuit is required to convert mains supply into constant current output or constant voltage output so as to drive the LED. Under occasions of phase-control dimming, an LED dimmer circuit may include a phase-control light dimmer and an LED drive circuit.

FIG. 1 illustrates a schematic diagram of a prior art phase-control light dimmer. As shown in FIG. 1, holding current is required for conduction of triac (DIAC, TRIC). Therefore, in order to realize LED dimming, a fixed load (also known as a dead load or a bleeder resistor) is added in many types of LED driver circuits to hold a minimum breakover current during conduction, thus enabling a phase angle signal for dimming control to be detected accurately. For example, FIG. 2 illustrates an LED dimmer circuit employing the phase-control light dimmer of FIG. 1, an LM3445 scheme adopted by U.S. National Semiconductor Corporation. However, additional fixed loads, such as dead load 21 in FIG. 2, may cause relatively great loss, which may reduce efficiency of an LED drive circuit.

In some occasions, a PFC (power factor correction) scheme is adopted for a prior LED drive circuit. During conduction of the phase-control light dimmer, input current and input voltage of the drive circuit are same in phase and proportional in amplitude. The LED drive circuit may use an output load as a load of a light dimmer, thus leaving out a dead load. By sampling a conduction angle of input voltage of the drive circuit, the LED drive circuit filters the conduction angle and converts it into a DC signal whose amplitude is in direct proportion to the conduction angle of dimming signal output by the phase-control light dimmer. The DC signal is used as a reference for comparing with an output current, so as to output an error signal and to control magnitude of the output current. However, this dimming mode has problems of startup flickering and failure of wide range dimming. Specifically speaking, if the phase-control light dimmer is started up when the conduction angle is relatively small, a certain delay time exists when the conduction angle of the input voltage is filtered and converted into the DC signal, and the DC signal within the delay time fails to reflect change of the phase angle for the input voltage in a rapid and accurate way, thus leading to higher current reference and heavier output current within the delay time, which may cause flickering. Moreover, there may be also problems of complex reference sampling circuits and excessive elements.

SUMMARY

The embodiments of the present disclosure provide an LED drive circuit, including: a rectifier circuit, configured to receive a phase-control dimming signal with a conduction angle and output a rectified signal; a converter, including a switching element, an input end of the converter being coupled to the rectifier circuit and an output end of the converter being coupled to an LED; and a controller, having a first input end, a second input end and an output end, the first input end of the controller being configured to receive the rectified signal, the second input end of the controller being configured to receive a first sampling signal from the LED, the first sampling signal indicating a current flowing through the LED, and the output end of the controller being configured to output a control signal according to the rectified signal and the first sampling signal; wherein, the switching element receives the control signal from the controller, thus executing an on/off operation to control the current flowing through the LED.

The embodiments of the present disclosure also provide a method for driving an LED employing an LED drive circuit. The LED drive circuit includes: a rectifier circuit, a converter having a switching element, and a controller, wherein an input end of the converter is coupled to the rectifier circuit and an output end of the converter is coupled to an LED; the controller is coupled to the rectifier circuit, the LED and the switching element of the converter. The method includes: the rectifier circuit receiving a phase-control dimming signal with a conduction angle, and outputting a rectified signal; the converter receiving the rectified signal and outputting a power to the LED; sampling a current flowing through the LED so as to generate a first sampling signal; the controller receiving the rectified signal and the sampling signal, and outputting a control signal; and the switching element receiving the control signal, thus executing an on/off operation to control the current flowing through the LED.

It can be known from the foregoing technical solution that the embodiments of the present disclosure may at least in part realize following advantageous effects: the power-limited LED drive circuit can be started without flicker, and is able to achieve a wide range linear dimming of an LED load without arrangement of dead load in circuits; moreover, a circuit structure is simplified and the number of circuit elements is reduced.

DETAILED DESCRIPTION

Reference will be made in detail to embodiments of the present disclosure hereinafter in combination with foregoing drawings of specification, in which the same reference numbers represent similar elements as far as possible. It is to be noticed that embodiments described herein are only for illustration and are not restrictive of the present disclosure.

Figure 8:
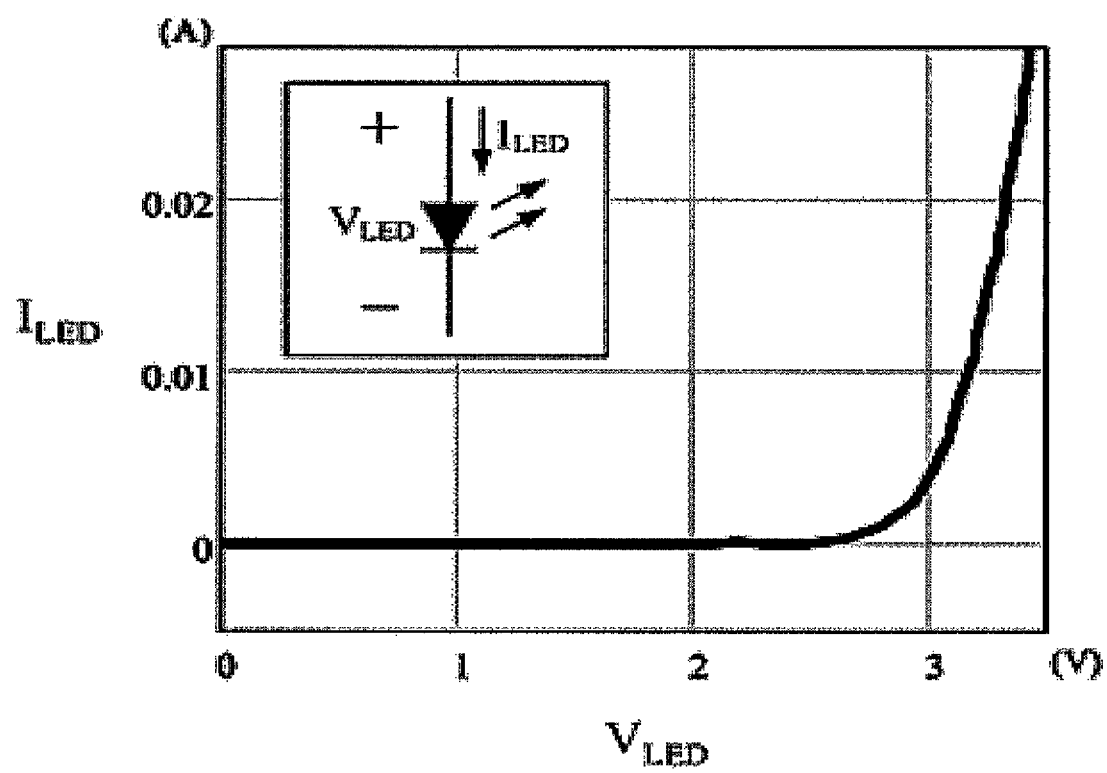
FIG. 8 illustrates a schematic diagram of V-I load characteristics of an LED lamp.

The LED drive circuit in the embodiment utilizes a power-limited mode to drive an LED and to realize phase-control dimming of the LED. As shown in FIG. 8, it can be seen from V-I characteristics of an LED that LED voltage basically does not vary with LED current. In other words, LED current may be varied greatly but LED voltage basically does not change. Thus it may be deduced that the LED works at a constant voltage within a certain range of current. Therefore, as for dimming of the LED, the power-limited dimming mode utilized in the embodiments may be explained as current-limited dimming i.e., LED dimming is realized by controlling a current flowing through the LED in the embodiments.

Figure 1:
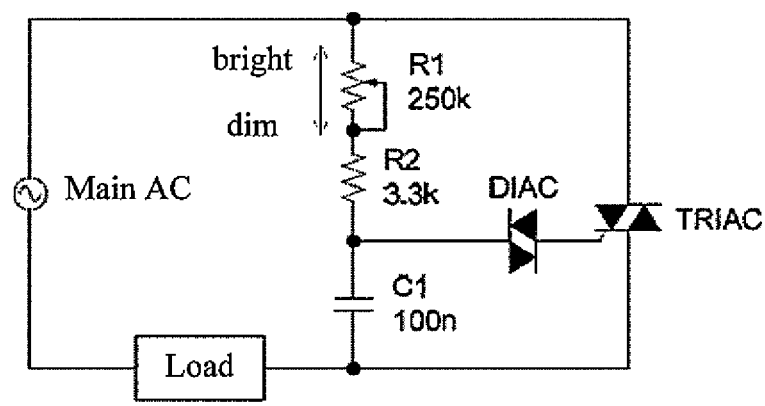
FIG. 1 illustrates a schematic diagram of an internal circuit structure of a commonly-used light dimmer.
Figure 2:
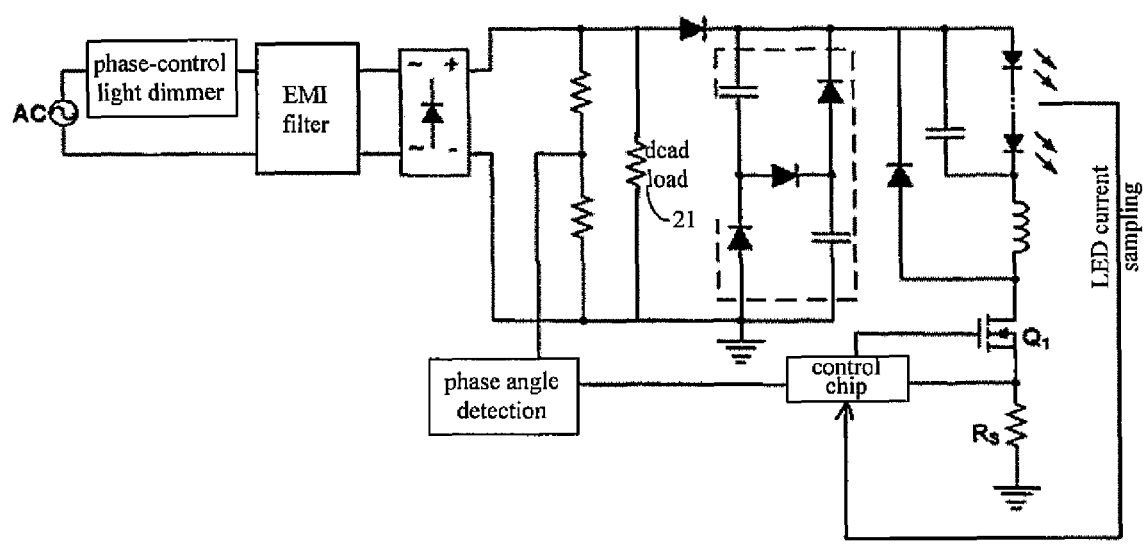
FIG. 2 illustrates a schematic diagram of an internal circuit structure of an LM3445 light dimmer.
Figure 3:
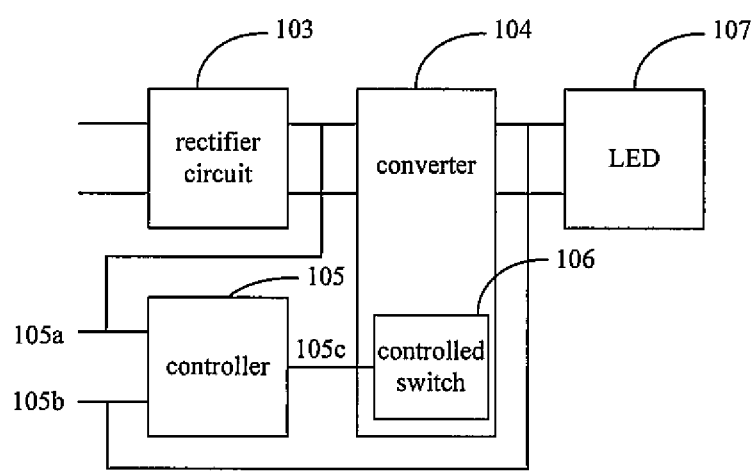
FIG. 3 illustrates a schematic block diagram of an LED drive circuit according to an embodiment of the present disclosure.

FIG. 3 illustrates a schematic block diagram of an LED drive circuit according to an embodiment of the present disclosure. As shown in FIG. 3, the LED drive circuit in the embodiment includes: a rectifier circuit 103, a converter 104 and a controller 105. Wherein, the rectifier circuit 103 is configured to receive a phase-control dimming signal with a conduction angle, and output a rectified signal corresponding to the phase-control dimming signal; the converter 104 including a controlled switch 106 is coupled to the rectifier circuit 103, an output end of the converter 104 is coupled to an LED 107; the controller 105 is provided with a first input end 105a, a second input end 105b and an output end 105c, the first input end 105a of the controller 105 is configured to receive the rectified signal, the second input end 105b of the controller 105 is electrically coupled to the LED 107 and is configured to receive a first sampling signal from the LED, the first sampling signal indicates a current flowing through the LED, and the output end 105c of the controller 105 is configured to output a control signal according to the rectified signal with the conduction angle and the first sampling signal; wherein, the controlled switch 106 is configured to receive the control signal from the controller 105, thus executing an on/off operation to control the current flowing through the LED 107. It should be explained that connection lines in block diagrams are only for schematic, and do not indicate actual connection relationship between circuit elements.

In an embodiment, when the conduction angle is greater than or equal to a set angle, the controller 105 outputs such a control signal that the first sampling signal is equal to a first current reference; and when the conduction angle is smaller than the set angle, the controller 105 outputs such a control signal that the first sampling signal may vary in the same trend as the conduction angle. The variation in the same trend herein means that, in the overall trend, the first sampling signal increases with the increase of the conduction angle, and decreases with the decrease of the conduction angle. The set angle herein refers to a conduction angle of the phase-control dimming signal at the time when current flowing through the LED starts decreasing from full load current. The set angle may be determined by a phase-control light dimmer and product design specification. The full load current refers to a rated current of the whole circuit system including an LED and an LED drive circuit.

Figure 4:
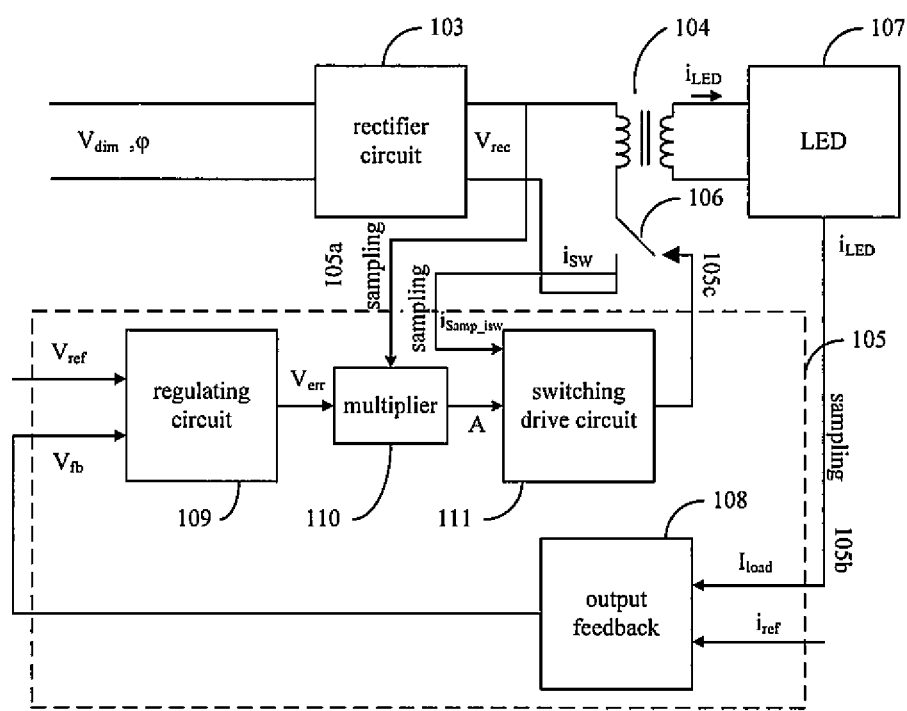
FIG. 4 illustrates a schematic circuit diagram of an LED drive circuit according to an embodiment of the present disclosure.
Figure 15:
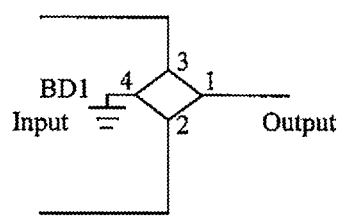
FIG. 15 and FIG. 16 illustrate schematic circuit diagrams of a rectifier circuit in the embodiment as shown in FIG. 4.
Figure 16:
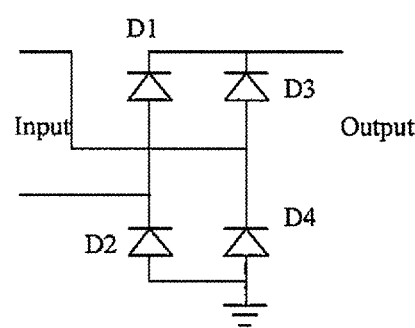

FIG. 4 illustrates a schematic circuit diagram of an LED drive circuit according to an embodiment of the present disclosure. As shown in FIG. 4, the LED drive circuit includes: a rectifier circuit 103, a converter 104 and a controller 105. Wherein, the rectifier circuit 103 is configured to receive a phase-control dimming signal $V_{dim}$ with a conduction angle $\phi$ and to output a rectified signal $V_{rec}$ with the conduction angle $\phi$; the converter 104 including a controlled switch 106 is coupled to the rectifier circuit 103, an output end of the converter 104 is coupled to an LED 107, and the converter 104 provides the LED 107 with output power. In an embodiment, the converter 104 may be a flyback circuit, but is not limited thereto. For example, the converter 104 may be also a forward circuit, a buck circuit, a boost circuit or a buck-boost circuit and the like, as appropriate. As well known in the art, the structure of the flyback circuit 104 is not elaborated herein. An input of the rectifier circuit 103 is configured to receive a phase-control dimming signal with a conduction angle and to output a rectified signal with the conduction angle. In an embodiment, the rectifier circuit may be but is not limited to a rectifier bridge as shown in FIG. 15 or a rectifier bridge including four diodes as shown in FIG. 16, as appropriate, not elaborated herein.

In order to realize dimming of the LED 107, the first input end 105a of the controller 105 receives a rectified signal $V_{rec}$, the second input end 105b receives a first sampling signal indicating current flowing through the LED 107, and the output end 105c outputs a control signal to the controlled switch 106 of the converter 104 so as to control on/off of the controlled switch 106, thus controlling the current flowing through the LED 107. In the embodiments of the present disclosure, the first sampling signal indicating the current flowing through the LED may be an average value $I_{load}$ of output current $i_{LED}$. Moreover, in the embodiments of the present disclosure, the controller 105 outputs the control signal according to the conduction angle $\phi$ in the rectified signal $V_{rec}$, and enabling by the control signal that the average value $I_{load}$ of output current $i_{LED}$ is equal to a first current reference $i_{ref}$, or that the average value $I_{load}$ of output current $i_{LED}$ varies in the substantially same trend as the conduction angle $\phi$. The variation in the same trend herein means that, in the overall trend, the output current $i_{LED}$ increases with the increase of the conduction angle $\phi$, and decreases with the decrease of the conduction angle $\phi$. In the embodiments of the present disclosure, the current flowing through the LED is not limited to the average value of output current, it may be determined based on actual conditions, for example, it may be an instantaneous value of output current, etc.

In an embodiment, when the conduction angle $\phi$ is greater than or equal to a set angle $\phi_{set}$, the controller 105 outputs such a control signal that the average value $I_{load}$ of output current $i_{LED}$ is equal to a first current reference $i_{ref}$ and when the conduction angle $\phi$ is smaller than the set angle $\phi_{set}$, the controller 105 outputs such a control signal that the average value $I_{load}$ of output current $i_{LED}$ varies in the same trend as the conduction angle ϕ. In an embodiment, the first current reference $i_{ref}$ may be set as the rated current of the whole circuit system including an LED and an LED drive circuit. The set angle $ϕ_{set}$ is a conduction angle ϕ of the phase-control dimming signal $V_{dim}$ at the time when the average value $I_{load}$ of output current $i_{LED}$ starts to decrease from the first current reference $i_{ref}$, and the set angle $ϕ_{load}$ may be determined by a phase-control light dimmer and product design specification.

As shown in FIG. 4, in the present embodiment, the controller 105 further includes an output feedback 108, a regulator 109, a multiplier 110 and a switching drive circuit 111. The output feedback 108 is configured to receive the average value $I_{load}$ of output current $i_{LED}$ and the first current reference $i_{ref}$, and to selectivity enable or disable the feedback signal $V_{fb}$ to be output according to the average value $I_{load}$ of output current $i_{LED}$ and the first current reference $i_{ref}$. When the output feedback 108 outputs the feedback signal $V_{fb}$, the regulator 109 receives the feedback signal $V_{fb}$ and a reference signal $V_{Ref}$ and outputs regulating signal $V_{err}$ corresponding to the feedback signal $V_{fb}$. Conversely, when the output feedback 108 does not output the feedback signal $V_{fb}$, the regulator 109 only receives the reference signal $V_{Ref}$ and outputs a regulating signal $V_{err}$ with constant amplitude. The multiplier 110 is configured to output a signal A corresponding to a rectified voltage signal $V_{rec}$ acquired by sampling, a regulating signal $V_{err}$ and a coefficient K of itself, and the signal A may serve as a second current reference. The switching drive circuit 111 is configured to output a control signal according to the signal A and the second sampling signal $i_{samp\_isw}$ indicating the switch current $i_{sw}$ flowing through the controlled switch 106, thus controlling the current flowing through the LED and the switch current by controlling duty ratio of the controlled switch 106.

Figure 5:
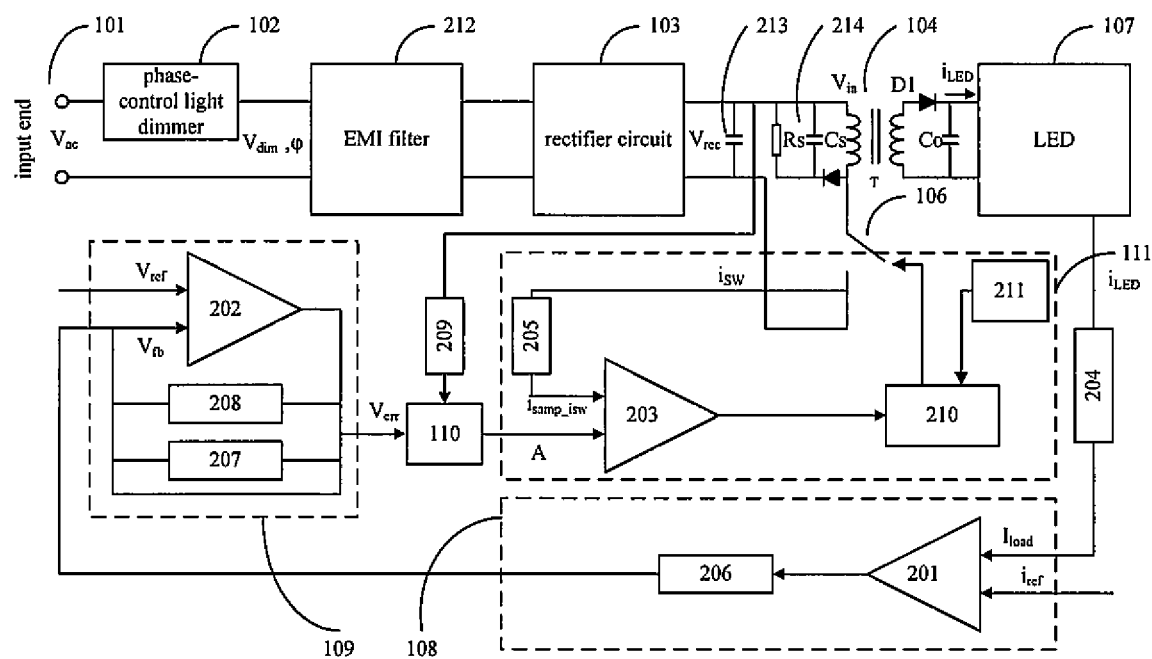
FIG. 5 illustrates a schematic circuit diagram of an LED drive circuit according to another embodiment of the present disclosure.
Figure 10:
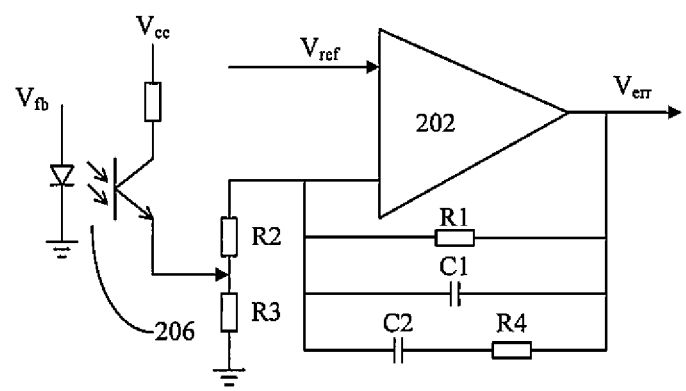
FIG. 10 illustrates a schematic circuit diagram of a regulator in the embodiment as shown in FIG. 9.

FIG. 5 illustrates a schematic circuit diagram of an LED drive circuit according to another embodiment of the present disclosure. On the basis of the embodiment as shown in FIG. 4, the LED drive current of the embodiment also includes an input end 101 and a phase-control light dimmer 102, wherein the input end 101 is configured to receive an AC input signal $V_{ac}$; the phase-control light dimmer 102 is coupled to the input end 101 and is configured to output the phase-control dimming signal $V_{dim}$ with a conduction angle ϕ to the rectifier circuit 103. Further, on the basis of the embodiment as shown in FIG. 4, the output feedback 108 of the embodiment includes a first operational amplifier 201 and a signal transmission circuit 206, wherein the first operational amplifier 201 is coupled to a first current sampling unit 204 and is configured to receive the average value $I_{load}$ of output current $i_{LED}$ sampled by the first current sampling unit 204 and the first current reference $i_{ref}$, and to output a feedback signal $V_{fb}$. The signal transmission circuit 206 is coupled to the first operational amplifier 201 and is configured to receive the feedback signal $V_{fb}$ output by the first operational amplifier 201. The signal transmission circuit 206 enables the feedback signal to be output when the average value $I_{load}$ of output current $i_{LED}$ is greater than or equal to the first current reference $i_{ref}$. Conversely, the signal transmission circuit 206 disables the feedback signal to be output when the average value $I_{load}$ of output current $i_{LED}$ is smaller than the first current reference. In an embodiment, the signal transmission circuit 206 may be non-isolated. However, on some occasions required for isolation (referring to the embodiment as shown in FIG. 10), the signal transmission circuit 206 may be an isolated circuit (for example, an optocoupler 206), which receives the feedback signal $V_{fb}$ output by the first operational amplifier 201 so as to generate an isolated feedback signal $V_{fb}$ to the regulator 109 when the average value $I_{load}$ of output current $i_{LED}$ is greater than or equal to the first current reference $i_{ref}$. When the average value $I_{load}$ of output current $i_{LED}$ is smaller than the first current reference $i_{ref}$, the feedback signal $V_{fb}$ is a negative value, the signal transmission circuit 206 is unable to work, thus the feedback signal $V_{fb}$ cannot be transmitted to the regulator, i.e., the feedback signal is disabled to be output.

Figure 6:
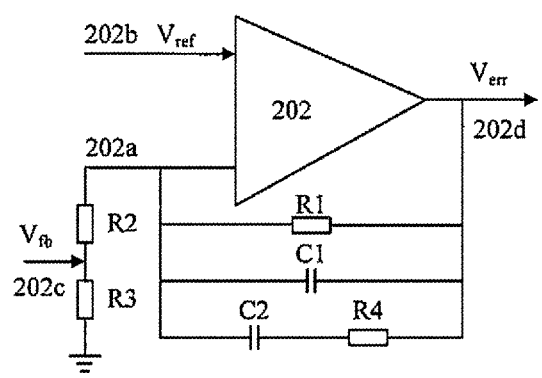
FIG. 6 illustrates a schematic circuit diagram of a regulator in the embodiment as shown in FIG. 5.

In the embodiment, the regulator 109 includes a second operational amplifier 202, a feedback proportioning element 207 and a feedback closed loop compensating circuit 208. As shown in FIG. 6, the second operational amplifier 202 is provided with a first input end 202a, a second input end 202b configured to receive the reference signal $V_{Ref}$ and an output end 202d configured to output the regulating signal $V_{err}$. The feedback proportioning element 207 includes a first resistor R1 coupled between the first input end 202a and the output end 202d as well as a second resistor R2 and a third resistor R3 in series between the first input end 202a and a reference ground. The output end of the signal transmission circuit 206 is coupled to a common node 202c of the second resistor R2 and the third resistor R3. When the output feedback 108 outputs a feedback signal $V_{fb}$, the feedback signal $V_{fb}$ is input to the common node 202c. However, when the output feedback 108 does not output a feedback signal, the second resistor R2 and the third resistor R3 serve as resistors connected in series in the feedback proportioning element 207. The feedback closed loop compensating circuit 208 includes a first capacitor C1 coupled in parallel with the first resistor R1 as well as a second capacitor C2 and a fourth resistor R4 connected in series with each other and then coupled in parallel with the first resistor R1.

The multiplier 110 outputs a signal A by receiving a rectified voltage signal $V_{rec}$ acquired by an input voltage sampling unit 209 and a regulating signal $V_{err}$ output by the regulator 109 in combination with a coefficient K of the multiplier 110.

In the embodiment, the switching drive circuit 111 includes a second current sampling unit 205, a third operational amplifier 203 and a drive unit 210. The second current sampling unit 205 outputs a second sampling signal $i_{samp\_isw}$ by sampling the switch current $i_{sw}$, indicating the current flowing through the controlled switch 106. The third operational amplifier 203 is configured to receive the second sampling signal $i_{samp\_isw}$ and the signal A output by the multiplier 110, and to output a control signal. The drive unit 210 is coupled to a control terminal of the controlled switch 106 and to the third operational amplifier 203, and is configured to control duty ratio of the controlled switch 106 according to the control signal output by the third operational amplifier 203, thus controlling the currents flowing through the controlled switch 106 and the LED 107.

Figure 7:
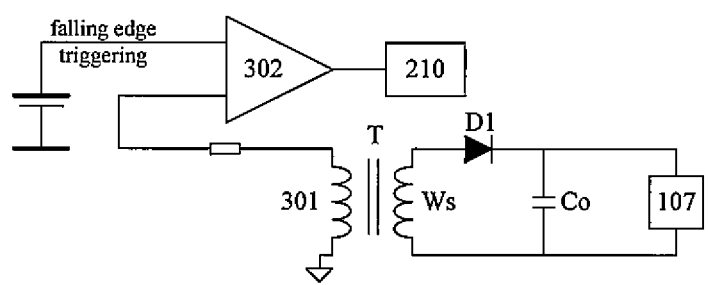
FIG. 7 illustrates a schematic circuit diagram of a zero-cross detection circuit in the embodiment as shown in FIG. 5.

In addition, the switching drive circuit 111 also includes a zero cross detecting unit 211, as shown in FIG. 5, which is coupled to the drive unit 210. In an embodiment, as shown by FIG. 7, a zero cross detecting unit 211 includes an auxiliary winding 301 and a zero-cross detection circuit. The auxiliary winding 301 is coupled to a secondary winding Ws of a transformer T, and the voltage of the auxiliary winding 301 is proportion to the voltage of the secondary winding Ws. The zero-cross detection circuit outputs, by detecting voltage across the auxiliary winding 301, an on signal to the drive unit 210 when the voltage of the secondary winding Ws is crossing zero, so as to conduct the controlled switch 106, thus ensuring the drive circuit to keep working at a BCM (Boundary Conduction Mode).

As shown in FIG. 7, energy from the primary winding of the transformer T is transmitted to the secondary winding Ws of the transformer T and then to an output capacitor Co and the LED 107 when an output diode D1 is conductive, the voltage of the secondary winding Ws is positive on the top and negative on the bottom, and voltage coupled to the auxiliary winding 301 is also positive on the top and negative on the bottom. When the output diode D1 is off, the voltage of the secondary winding Ws changes to zero, and the voltage coupled to the auxiliary winding 301 is also zero. Therefore, the voltage across the auxiliary winding 301 changes from a positive value to zero, a falling edge is formed. If the falling edge is detected by the fourth operational amplifier 302, the fourth operational amplifier 302 outputs an on signal to the drive unit 210 for controlling the controlled switch 106 to be conductive. It should be explained that the controlled switch 106 is controlled to be conductive by the zero cross detecting unit 211 so as to ensure the drive circuit to work at the BCM. However, the control signal generated by the third operational amplifier 203 is used to adjust duty ratio, i.e. on/off time of the controlled switch 106. The on signal generated by the zero cross detecting unit 211 and the control signal generated by the third operational amplifier 203 are mutually combined for controlling the controlled switch 106, thus controlling the current flowing through the LED and realizing LED dimming.

As shown in FIG. 5, on the basis of the embodiment as shown in FIG. 4, the LED dimmer circuit further includes an EMI filter 212, a filter capacitor 213 and a clamping circuit 214. In an embodiment, the EMI filter 212 is configured to perform a low-pass filtering of the regulating signal $V_{dim}$ output by the phase-control light dimmer 102. The filter capacitor 213 may have a very small capacitance value, for high frequency filtering so that a voltage across the filter capacitor 213 is consistent with an AC input voltage signal $V_{AC}$. The clamping circuit 214 includes a resistor Rs, a capacitor Cs and series diodes connected in parallel with each other so as to reduce the stress of the controlled switch 106.

FIG. 5 is taken as an example for a brief description of working principle of the LED drive circuit in the embodiment hereinafter.

When the phase-control light dimmer 102 has a relative large conduction angle (i.e., when the conduction angle ϕ is greater than or equal to a set angle $\phi_{set}$), the feedback proportioning element 207 does not work, and only the feedback closed loop compensating circuit 208 works. The regulator 109 serves as a feedback closed loop regulator, and the control mode of the controller 105 is feedback closed-loop control. Both the set first current reference $i_{ref}$ and the average value $I_{load}$ of output current are input into the first operational amplifier 201, a feedback signal $V_{fb}$ is outputted by a comparison between the first current reference $i_{ref}$ and the average value $I_{load}$. The average value $I_{load}$ of output current is greater than or equal to the first current reference $i_{ref}$, and the signal transmission circuit 206 outputs the feedback signal $V_{fb}$ to the regulator 109. Both the feedback signal $V_{fb}$ and a reference signal $V_{Ref}$ are input into the regulator 109, and a regulating signal $V_{err}$ is output. A rectified voltage signal $V_{rec}$ acquired by the input voltage sampling unit 209, a regulating signal $V_{err}$ output by the second operational amplifier 202 and a coefficient K of the multiplier 110 serve as inputs into the multiplier 110, thus a signal A is output by the multiplier 110.

Then the signal A output by the multiplier 110 serves as a second current reference of the third operational amplifier 203, and the second current sampling unit 205 samples switch current $i_{sw}$, thus acquiring a second sampling signal $i_{samp\_isw}$. In the present embodiment, the second current sampling unit 205 is implemented by using a resistor having a resistance of R. Therefore, the second sampling signal $i_{samp\_isw}$ in the embodiment is equal to $i_{sw}*R$. The output control signal acquired thereby at the third operational amplifier 203 is used to control duty ratio D of the controlled switch 106, thus controlling that the average value $I_{load}$ of output current $i_{LED}$ is equal to the first current reference $i_{ref}$.

As mentioned above, when the phase-control light dimmer 102 has a relative large conduction angle ϕ, the feedback closed loop regulator 109 ensures, by means of feedback closed-loop control of the controller, that the average value $I_{load}$ of output current $i_{LED}$ may reach the first current reference $i_{ref}$ according to the output regulating signal $V_{err}$. As for the LED 107, a voltage $V_{LED}$ across the LED is constant, its output power $Po=V_{LED}*I_{load}$. The rectified voltage signal $V_{rec}$ is multiplied by the regulating signal $V_{err}$ at the multiplier 110 so as to control the waveform of input current, thus realizing PFC, i.e. input current is in same phase with input voltage and in direct proportion with the input voltage in amplitude.

In some embodiments, in the foregoing feedback closed-loop control, ripple exists in output current $i_{LED}$, where the output current $i_{LED}$ may be smaller than the first current reference $i_{ref}$. The first operational amplifier 201 outputs a feedback signal $V_{fb}$. The signal transmission circuit 206 disables a feedback signal to be output, the regulator 109 outputs a regulating signal $V_{err}$ which is gradually increased. However, as the feedback closed-loop control plays a dominant role in the above regulating process, finally it may realize the fact that the average value $I_{load}$ of output current $i_{LED}$ is equal to the first current reference $i_{ref}$.

As the conduction angle ϕ of the phase-control light dimmer 102 is gradually decreased, $V_{rec}$ is also decreased. In order to keep the average value $I_{load}$ of output current $i_{LED}$ constant, output regulating signal $V_{err}$ of the regulator is gradually increased. However, after the conduction angle reduces to a certain critical angle (i.e., when the conduction angle ϕ is smaller than a set angle $\phi_{set}$), it is unable to keep the average value $I_{load}$ of output current $i_{LED}$ at $i_{ref}$ by regulating the regulating signal $V_{err}$ via the regulator 109. Thus, the average value of output current is decreased. When the average value $I_{load}$ of output current $i_{LED}$ is smaller than the first current reference $i_{ref}$, the feedback closed loop compensating circuit 208 does not work anymore, but the feedback proportioning element 207 works. The critical conduction angle (i.e., the set angle $\phi_{set}$) may be adjusted by regulating the rectified voltage signal $V_{rec}$, the resistance R of the second current sampling unit 202 and the resistance proportion of the feedback proportioning element 207. However, as low-frequency high ripple exists in output current of the single-stage PFC circuit, feedback closed loop still works when peak ripple of output current is greater than the set average value of output current. Thus, the feedback closed loop compensating circuit 208 still participates in control at peak ripple of output current so that the regulating signal $V_{err}$ output by the regulator 109 is reduced, and the driver goes into a superficially power-limited status.

Then, the conduction angle of the phase-control light dimmer 102 continues decreasing, so does $V_{rec}$. Accordingly, only the feedback proportioning element 207 plays a role in control instead of the feedback closed loop compensating circuit 208, and the controller enters into an open-loop control. The regulator 109 outputs a maximum value $V_{err.max}$ which may be freely set by technicians, for example, by setting the output limit value of the second operational amplifier 202. $V_{err.max}$ may be slightly greater than the amplitude of a regulating signal output by the regulator under a feedback closed-loop control.

As the regulator 109 outputs the maximum value $V_{err.max}$, the average value $I_{load}$ of output current $i_{LED}$ is decreased as the conduction angle φ of the phase-control light dimmer 102 continues decreasing. The output current at peak ripple is smaller than the first current reference, thus totally going into a feedback open-loop control, and the driver goes into a deeply power-limited status.

Under the deeply power-limited status, the average value $I_{load}$ of output current changes linearly with linear change of the conduction angle φ of the phase-control light dimmer 102. Therefore, under the power-limited status, output power also changes linearly with linear change of the conduction angle of the phase-control light dimmer. As can be seen from the foregoing LED drive circuit and control principle thereof the LED drive circuit may run at closed-loop control, superficially power-limited and deeply power-limited statuses, it may be available for achieving a wide range linear dimming of an LED and solving the problem of startup flickering, and capable of simplifying the circuit structure and reducing the quantity of circuit elements without any dead load.

In the embodiment, as mentioned above, the second current reference signal A is acquired when a rectified voltage signal $V_{rec}$, a regulating signal $V_{err}$ and a coefficient K of the multiplier 110 serve as inputs into the multiplier 110. However, the present disclosure is not limited thereto. A similar reference parameter may be acquired by other ways. In an embodiment, the similar reference parameter may be a parameter relating to a phase angle of input voltage. Such a parameter may be adjusted correspondingly according to feedback closed-loop signal when the conduction angle is relatively large, and after the conduction angle is reduced to a certain angle, the parameter varies in a substantially same trend as the conduction angle of input voltage.

Figure 9:
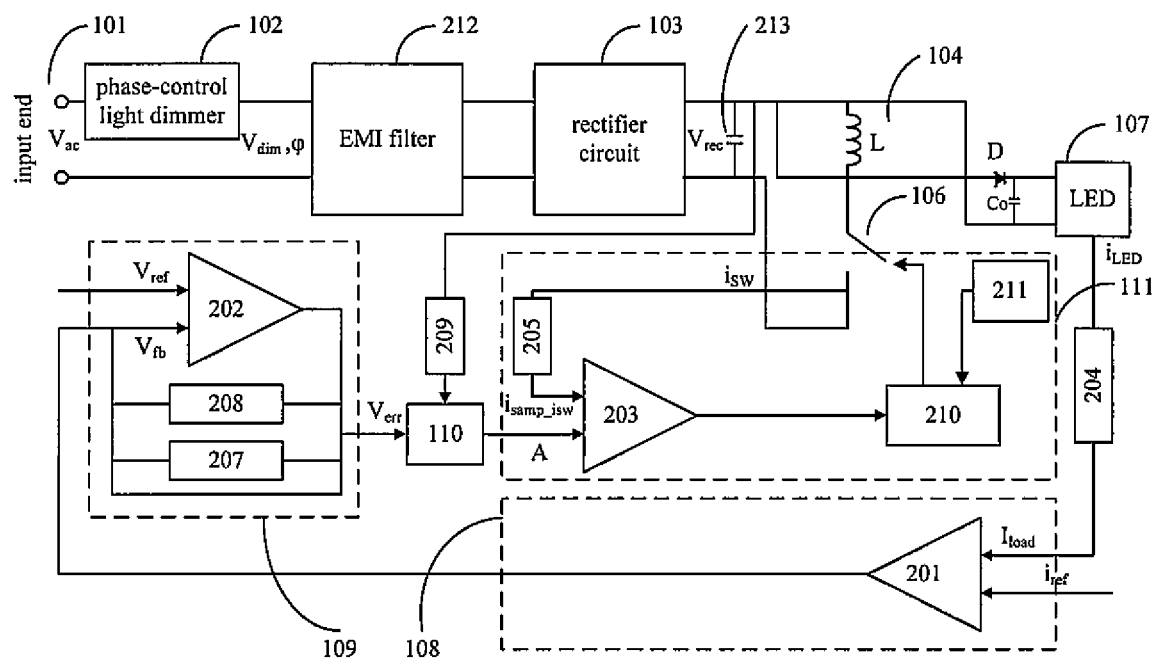
FIG. 9 illustrates a schematic circuit diagram of an LED drive circuit according to a further embodiment of the present disclosure.

A flyback topological structure of the converter 104 in FIG. 5 is taken as an example for a description of the LED drive circuit according to the present disclosure. However, the present disclosure is not limited to this. In an embodiment, the converter 104 in the embodiment as shown in FIG. 3 may be any one selected from a group consisting of a flyback converter, a buck-boost converter, a boost converter and a buck converter. FIG. 9 shows an LED drive circuit employing a non-isolated buck-boost topological structure. In the embodiment, isolation of inductor L is not required, neither a clamping circuit is required for reducing the stress of the controlled switch 106. Except that, the LED drive circuit of FIG. 9 is the same as that of FIG. 5, and will be not repeated herein. Similarly, within the spirit and scope of the present disclosure, the LED drive circuit herein also may be used in other appropriate topological structures of circuits.

FIG. 10 shows a schematic circuit diagram of the regulator 109 in the embodiment of FIG. 9, which is different from the circuit of FIG. 6 in that: in the circuit structure of FIG. 6, the feedback signal output by the first operational amplifier 201 shares a same reference ground with the second input end 202b of the second operational amplifier 202, thus isolation is not required for the feedback signal; while in the circuit structure of FIG. 10, the feedback signal output by the first operational amplifier 201 has a different reference ground from the second input end 202b of the second operational amplifier 202, thus, before being input into the second input end 202b, the feedback signal is isolated by the isolating signal transmission circuit 206. In the embodiment of FIG. 10, the first operational amplifier 201 receives the average value $I_{load}$ of output current $i_{LED}$ and the first current reference $i_{ref}$ and outputs a signal to the signal transmission circuit 206 which receives the signal; also, when the average value $I_{load}$ of output current $i_{LED}$ is greater than or equal to the first current reference $i_{ref}$, the signal transmission circuit 206 outputs the feedback signal to the second operational amplifier 202; when the average value $I_{load}$ of output current $i_{LED}$ is smaller than the first current reference $i_{ref}$, the signal transmission circuit 206 does not output the feedback signal. The working principle herein is similar to that of the structure of a non-isolated circuit in the signal transmission circuit 206 (not shown) in FIG. 6, and not repeated any more herein.

In an embodiment, the isolating signal transmission circuit 206 may be implemented by an optocoupler. It should be explained that FIG. 6 and FIG. 10 are respectively illustrated in combination with FIG. 5 and FIG. 9. However, those skilled in the art shall understand that the circuit structure of the regulator 109 is not limited to the embodiments mentioned above. For example, the regulator of FIG. 6 is applicable to the LED drive circuit of FIG. 9, and the regulator of FIG. 10 is also applicable to the LED drive circuit of FIG. 5.

Figure 11:
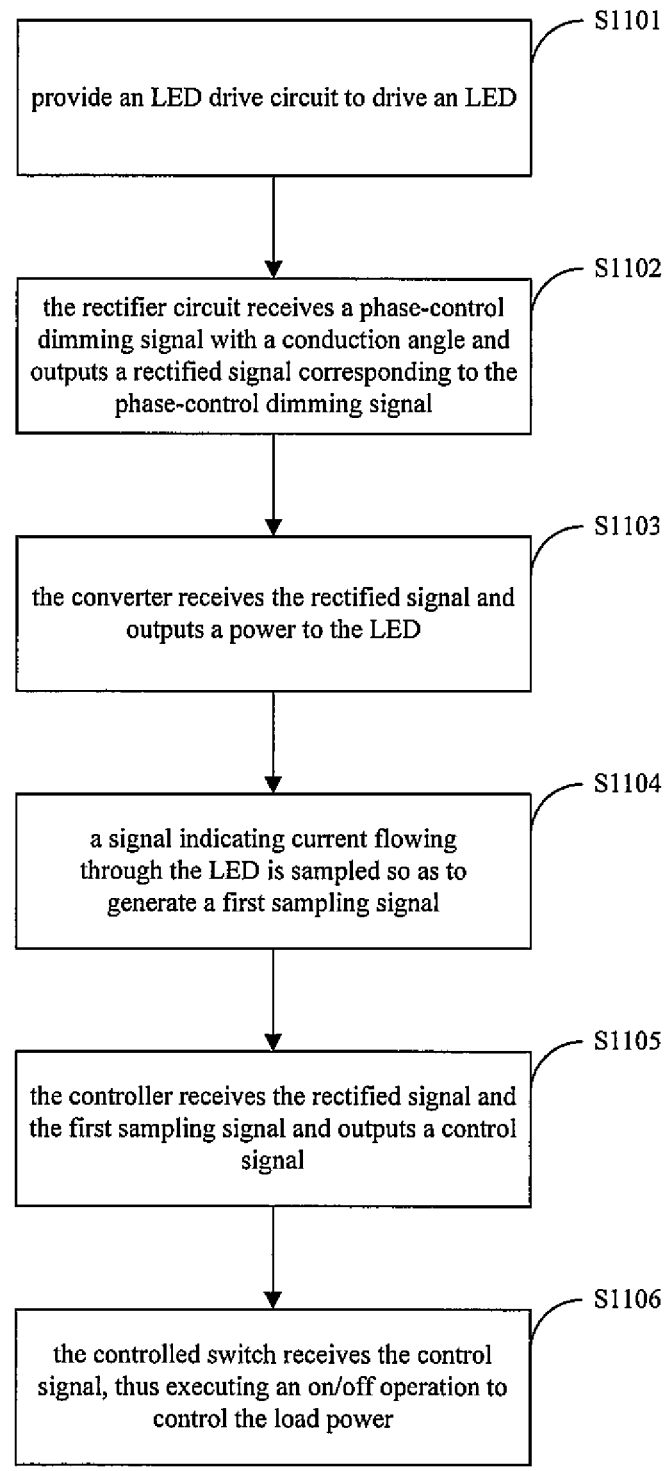
FIG. 11 illustrates a flow chart of a method for driving an LED according to an embodiment of the present disclosure.

FIG. 11 shows a flowchart of a method for driving an LED according to an embodiment of the present disclosure. The method of the embodiment is applicable to the LED drive circuit as described in FIGS. 3-9 so as to realize power-limited dimming, including following steps S1101-S1106.

In Step S1101, an LED drive circuit is provided to drive an LED.

In an embodiment, the LED drive circuit employs a block diagram structure as shown in FIG. 3, including a rectifier circuit 103, a converter 104 and a controller 105. The rectifier circuit 103 is configured to receive a phase-control dimming signal with a conduction angle and output a rectified signal; the converter 104 including a controlled switch 106 is coupled to the rectifier circuit 103, and an output end of the converter 104 is coupled to an LED 107; the controller 105 is provided with a first input end 105a, a second input end 105b and an output end 105c, the first input end 105a of the controller 105 is configured to receive the rectified signal, and the second input end 105b of the controller 105 is electrically coupled to the LED 107.

In an embodiment, the LED drive circuit also includes an input end 101 and a phase-control dimmer circuit 102. Correspondingly, the method for driving the LED also includes following steps after Step S1101: receiving an AC input signal; and outputting a phase-control dimming signal with a conduction angle according to the AC input signal. Further in an embodiment, the input end 101 receives the AC input signal, and the phase-control dimmer circuit 102 outputs the phase-control dimming signal with the conduction angle according to the AC input signal.

In Step S1102, the rectifier circuit receives a phase-control dimming signal with a conduction angle and outputs a rectified signal corresponding to the phase-control dimming signal.

In Step S1103, the converter receives the rectified signal and outputs a power to the LED.

In Step S1104, a signal indicating current flowing through the LED is sampled so as to generate a first sampling signal.

In Step S1105, the controller receives the rectified signal and the first sampling signal and outputs a control signal.

In Step S1106, the controlled switch receives the control signal, thus executing an on/off operation to control the load power.

Figure 12:
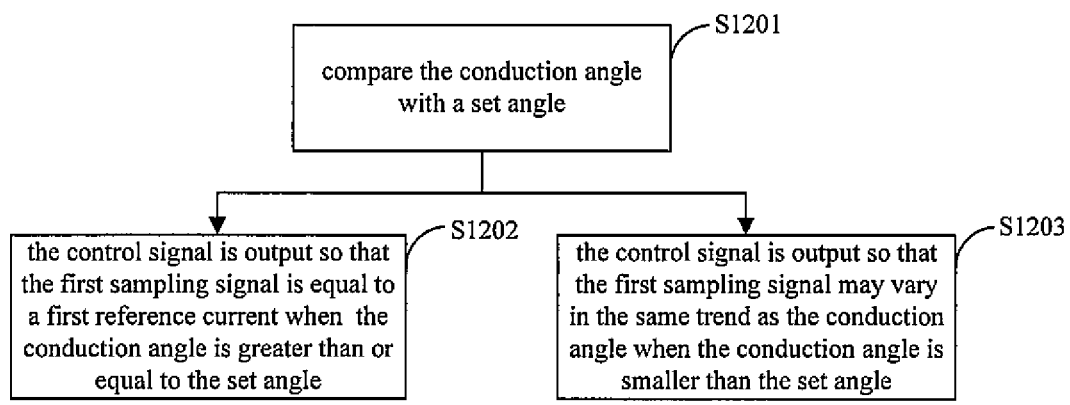
FIG. 12 illustrates a specific flow diagram of Step S1102 in the embodiment as shown in FIG. 11.

FIG. 12 shows a schematic flowchart of Step S1105 in the method of the embodiment of FIG. 11. In an embodiment, the controller receives the rectified signal and the first sampling signal and outputs a control signal, including Steps S1201-S1203.

In Step S1201, the conduction angle is compared with a set angle.

In Step S1202, the control signal is output so that the first sampling signal is equal to a first current reference when the conduction angle is greater than or equal to the set angle; and in Step S1203, the control signal is output so that the first sampling signal may vary in the same trend as the conduction angle when the conduction angle is smaller than the set angle.

Figure 13:
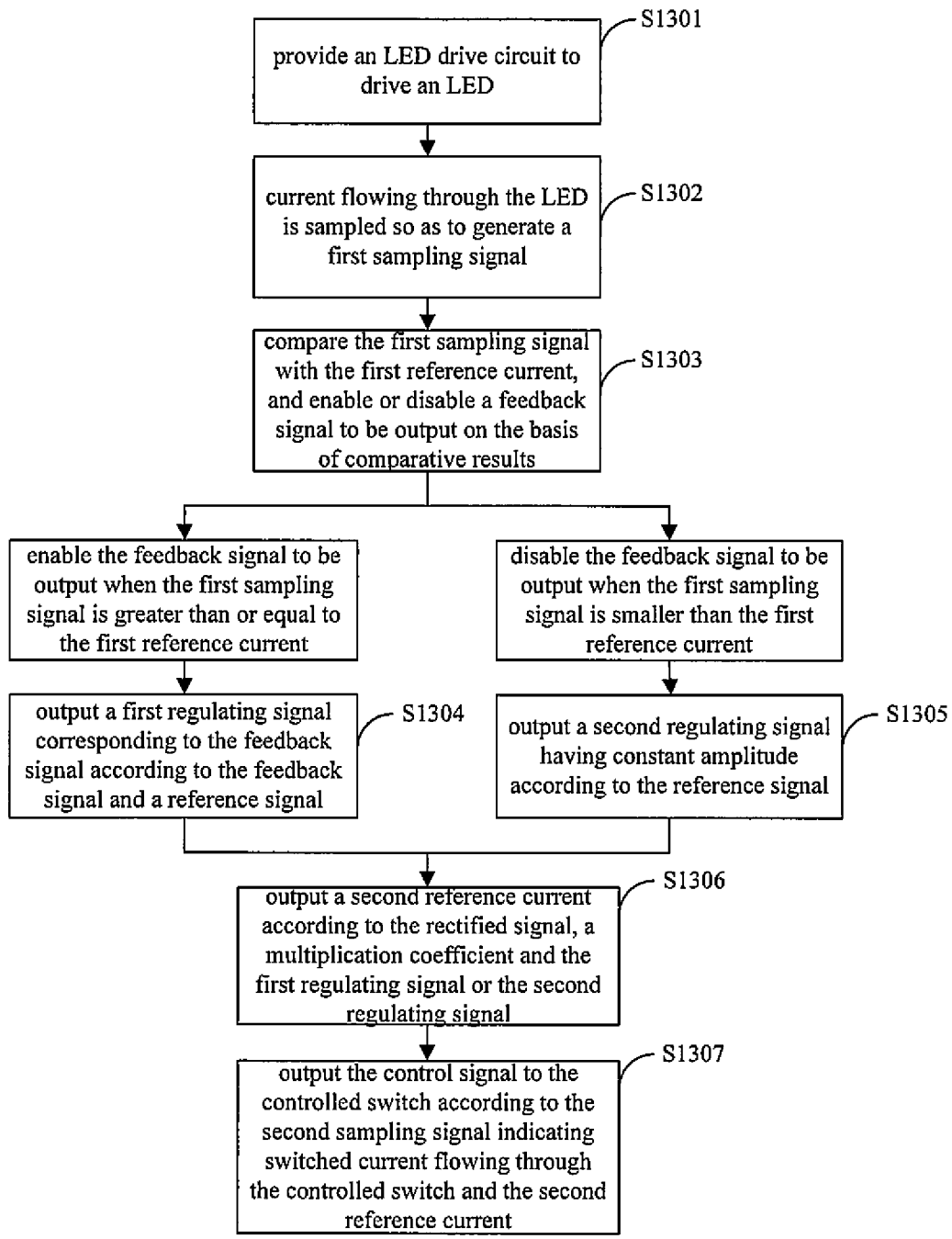
FIG. 13 illustrates a flow chart of a method for driving an LED according to another embodiment of the present disclosure.

FIG. 13 is a flow chart of a method for driving an LED according to another embodiment of the present disclosure. The method of the embodiment includes following Steps S1301-S1307.

In Step S1301, an LED drive circuit is provided to drive an LED.

In an embodiment, the LED drive circuit employs the circuit structure as shown in FIGS. 3-9, referring to above description of FIGS. 3-9, not repeated any more herein.

In Step S1302, current flowing through the LED is sampled so as to generate a first sampling signal.

In an embodiment, the first sampling signal is sampled by the first current sampling unit 204 as shown in FIG. 5.

In Step S1303, the first sampling signal is compared with the first current reference, and a feedback signal is enabled or disabled to be output on the basis of comparative results.

In an embodiment, the feedback signal is enabled to be output when the first sampling signal is greater than or equal to the first current reference, and the feedback signal is disabled to be output when the first sampling signal is smaller than the first current reference.

Further in an embodiment, the first operational amplifier 201 receives the first sampling signal and compares the first sampling signal with the first current reference, and further the signal transmission circuit 206 enables or disables the feedback signal to be output. Specifically speaking, the signal transmission circuit 206 disables the feedback signal to be output when the first sampling signal received by the first operational amplifier 201 is smaller than the first current reference.

In Step S1304, a first regulating signal corresponding to the feedback signal is output according to the feedback signal and a reference signal when the feedback signal is enabled to be output.

In an embodiment, the regulator 109 receives the feedback signal and the reference signal and outputs the first regulating signal.

In Step S1305, a second regulating signal having constant amplitude is output according to the reference signal when the feedback signal is disabled to be output.

In an embodiment, the regulator 109 only outputs a second regulating signal having constant amplitude when the signal transmission circuit 206 disables the feedback signal to be output.

In Step S1306, a second current reference is output according to the rectified signal, a multiplication coefficient and the first regulating signal or the second regulating signal.

In an embodiment, the multiplier 110 receives the rectified signal from the rectifier circuit 103 and the regulating signal from the regulator 109, and outputs a signal A according to the rectified signal, the regulating signal and a coefficient of the multiplier 110.

In Step S1307, the control signal is output to the controlled switch according to switch current flowing through the controlled switch and the second current reference.

In an embodiment, the switching drive circuit 111 receives the control signal for controlling duty ratio of the controlled switch 106.

Figure 14:
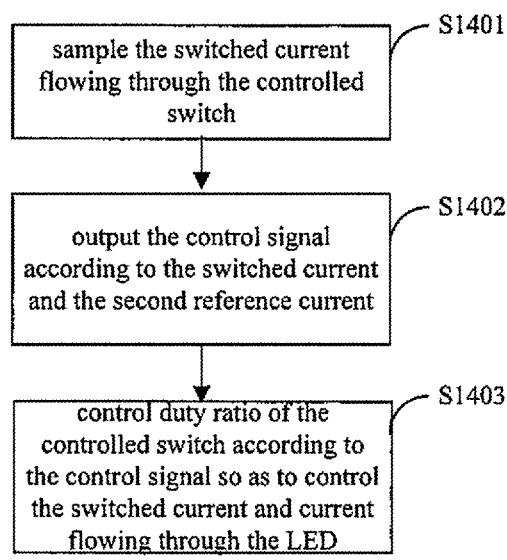
FIG. 14 illustrates a specific flow diagram of Step S1308 in the embodiment as shown in FIG. 13.

FIG. 14 shows a schematic flowchart of Step S1307 in the method of the embodiment of FIG. 13. In an embodiment, Step S1307 includes Steps S1401-S1403.

In Step S1401, the switch current flowing through the controlled switch is sampled to generate the second sampling signal indicating the switch current.

In an embodiment, switch current is, flowing through the controlled switch 106 is sampled by the second current sampling unit 205 as shown in FIG. 5, thus acquiring a second sampling signal $i_{samp\_isw}$.

In Step S1402, the control signal is output according to the second sampling signal and the second current reference.

In an embodiment, the third operational amplifier 203 receives the second sampling signal $i_{samp\_isw}$ and a signal A output by the multiplier 110, and outputs a control signal hereby.

In Step S1403, duty ratio of the controlled switch is controlled according to the control signal so as to control the switch current and current flowing through the LED 107.

In an embodiment, the drive unit 210 is coupled to the control terminal of the controlled switch 106, and controls duty ratio of the controlled switch 106 according to the control signal output by the third operational amplifier 203, thus controlling switch current $i_{sw}$ and current flowing through the LED 107.

Embodiments of the method for driving the LED according to the present disclosure may also be referred to description of the working principle of the LED drive circuit hereinabove, and will be not repeated any more herein.

Although description of the present disclosure is made in reference to a plurality of typical embodiments, it shall be understood that terms used herein are exemplary and explanatory only and are not restrictive. The present disclosure can be concretely implemented in various forms without departing from spirit or substance of the present disclosure. Therefore, it shall be understood that above embodiments are not limited to any foregoing detail, but shall be extensively interpreted within the spirit and scope as defined in appended claims. Thus, all variations and modifications falling within claims or equivalent scope thereof shall be covered with appended claims.

What is claimed is:

1. An LED drive circuit, comprising:
   a rectifier circuit configured to receive a phase-control dimming signal with a conduction angle and output a rectified signal;
   a converter comprising a switching element, an input end of the converter being coupled to the rectifier circuit and an output end of the converter being coupled to an LED; and
   a controller having a first input end, a second input end and an output end, the first input end of the controller being configured to receive the rectified signal, the second input end of the controller being configured to receive a first sampling signal from the LED, the first sampling signal indicating a current flowing through the LED, and the output end of the controller being configured to output a control signal according to the rectified signal and the first sampling signal;

wherein the switching element receives the control signal from the controller, thus executing an on/off operation to control the current flowing through the LED;

wherein the rectified signal carries the conduction angle, when the conduction angle is greater than or equal to a set angle, the controller outputs the control signal so that the first sampling signal is equal to a first current reference; when the conduction angle is smaller than the set angle, the controller outputs the control signal so that the first sampling signal varies in a same trend as the conduction angle; and wherein the controller comprises:

a first operational amplifier configured to receive the first sampling signal and the first current reference;

a signal transmission circuit configured to enable a feedback signal to be output when the first sampling signal is greater than or equal to the first current reference, or configured to disable the feedback signal to be output when the first sampling signal is smaller than the first current reference;

a regulator configured to receive the feedback signal and a reference signal to output a first regulating signal corresponding to the feedback signal when the feedback signal is enabled to be output, or configured to receive the reference signal and output a second regulating signal with a constant amplitude when the feedback signal is disabled to be output;

a multiplier configured to receive the rectified signal and the first regulating signal or the second regulating signal, and to output a second current reference according to a multiplication coefficient, the rectified signal and the first regulating signal or the second regulating signal; and a switching drive circuit configured to receive a second sampling signal indicating switch current flowing through the switching element and the second current reference, and to output the control signal.

2. The LED drive circuit of claim 1, wherein the signal transmission circuit is an isolated circuit or a non-isolated circuit.

3. The LED drive circuit of claim 1, wherein the regulator comprises:

a second operational amplifier having a first input end, a second input end configured to receive the reference signal, and an output end configured to output the regulating signal;

a feedback proportioning element comprising a first resistor coupled between the first input end and the output end of the second operational amplifier as well as a second resistor and a third resistor coupled in series and between the first input end of the second operational amplifier and a reference ground; the output end of the signal transmission circuit being electrically coupled to a common node of the second resistor and the third resistor; and a feedback closed loop compensating circuit comprising a first capacitor coupled in parallel across both ends of the first resistor as well as a second capacitor and a fourth resistor in series coupled in parallel with the first resistor.

4. The LED drive circuit of claim 1, wherein the switching drive circuit comprises:

a current sampling unit configured to sample the switch current flowing through the switching element and to generate the second sampling signal indicating the switch current;

a third operational amplifier configured to receive the second sampling signal and the second current reference and to output the control signal.

5. The LED drive circuit of claim 1, wherein the switching drive circuit comprises:

a drive unit coupled to the third operational amplifier and to a control terminal of the switching element for controlling a duty ratio of the switching element according to the control signal.

6. The LED drive circuit of claim 1, wherein the converter is any one selected from a group consisting of a flyback converter, a buck-boost converter, a boost converter and a buck converter.

7. The LED drive circuit of claim 1, further comprising:

an input end of the LED drive circuit configured to receive an AC input signal; and a phase-control dimmer circuit coupled to the input end of the LED drive circuit and configured to provide the phase-control dimming signal with the conduction angle.

8. The LED drive circuit of claim 1, further comprising: a filter capacitor coupled to an output end of the rectifier circuit and configured to conduct a high frequency filtering of the rectified signal.

9. A method for driving an LED employing an LED drive circuit, wherein the LED drive circuit comprises: a rectifier circuit, a converter having a switching element, and a controller; an input end of the converter being coupled to the rectifier circuit and an output end of the converter being coupled to the LED; the controller being coupled to the rectifier circuit, the LED and the switching element; wherein the LED drive method comprises:

the rectifier circuit receiving a phase-control dimming signal with a conduction angle, and outputting a rectified signal;

the converter receiving the rectified signal and outputting a power to the LED;

sampling a current flowing through the LED so as to generate a first sampling signal;

the controller receiving the rectified signal and the first sampling signal, and outputting a control signal; and the switching element receiving the control signal, thus executing an on/off operation to control the current flowing through the LED;

wherein the controller receiving the rectified signal and the first sampling signal and outputting a control signal comprises:

comparing the conduction angle with a set angle, and when the conduction angle is greater than or equal to the set angle, outputting the control signal so that the first sampling signal is equal to a first current reference; and when the conduction angle is smaller than the set angle, outputting the control signal so that the first sampling signal varies in a same trend as the conduction angle;

comparing the first sampling signal with the first current reference, and enabling or disabling a feedback signal to be output on the basis of comparative results;

outputting a first regulating signal corresponding to the feedback signal according to the feedback signal and a reference signal when the feedback signal is enabled to be output; and outputting a second regulating signal with a constant amplitude according to the reference signal when the feedback signal is disabled to be output;

outputting a second current reference according to the rectified signal, a multiplication coefficient and the first regulating signal or the second regulating signal; and outputting the control signal to the switching element according to the second current reference and a second sampling signal indicating switch current flowing through the switching element.

10. The method of claim 9, wherein the feedback signal is enabled to be output when the first sampling signal is greater than or equal to the first current reference, and the feedback signal is disabled to be output when the first sampling signal is smaller than the first current reference.

11. The method of claim 9, wherein the outputting the control signal according to the second current reference and the second sampling signal comprises:

sampling the switch current flowing through the switching element so as to generate the second sampling signal; and outputting the control signal according to the second sampling signal and the second current reference.

12. The method of claim 11, further comprising:
controlling a duty ratio of the switching element according to the control signal.

13. The method of claim 9, further comprising:
receiving an AC input signal via an input end of the LED drive circuit; and outputting the phase-control dimming signal with the conduction angle according to the AC input signal.

* * * * *